June 20, 1939.   M. P. YOUKER   2,163,113
GAS CONVERSION PROCESS
Filed Oct. 14, 1935
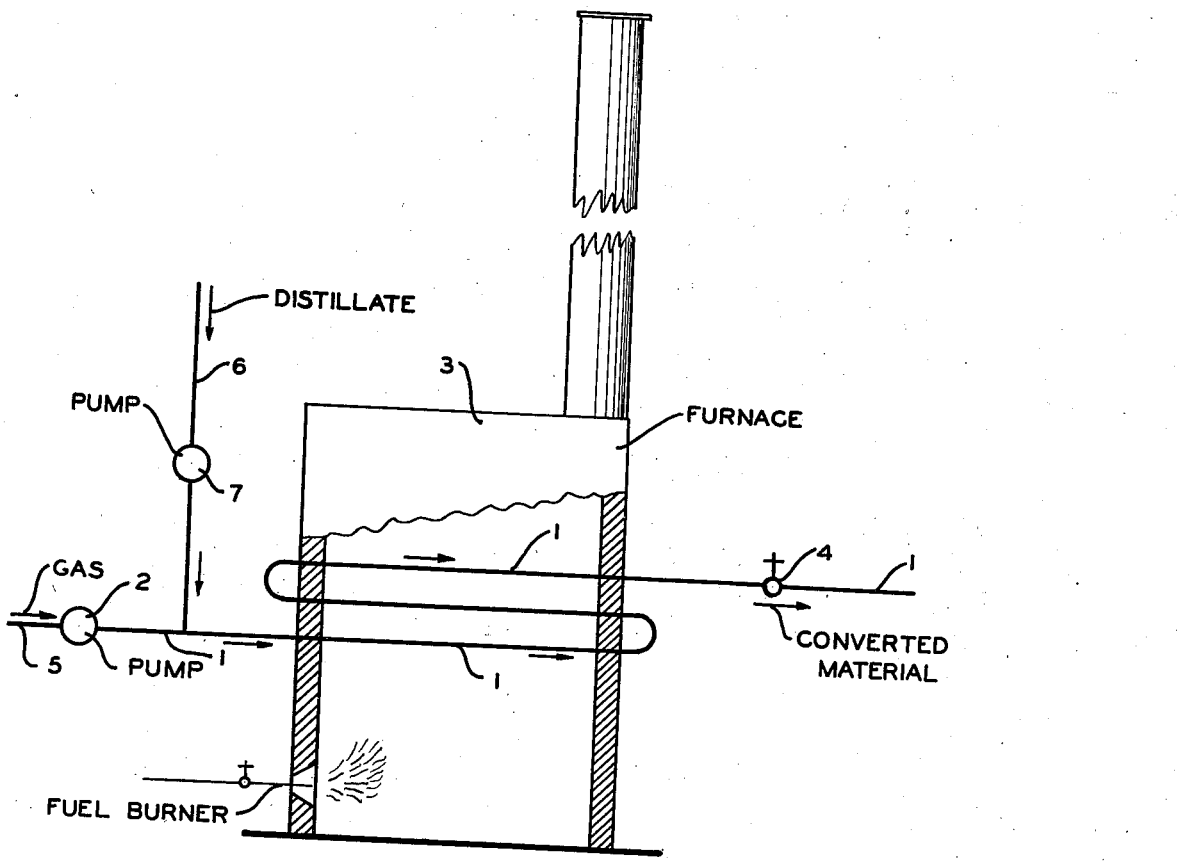

Patented June 20, 1939

2,163,113

UNITED STATES PATENT OFFICE 2,163,113

GAS CONVERSION PROCESS

Malcolm P. Youker, Bartlesville, Okla., assignor to Phillips Petroleum Company, Bartlesville, Okla., a corporation of Delaware Application October 14, 1935, Serial No. 44,917

1 Claim. (Cl. 196—9)

My new invention relates to chemically combining part of the carbon content of hydrocarbon liquids with hydrocarbon gases to thereby form hydrocarbon liquids and is an improvement in processes disclosed by the present applicant in my United States Letters Patent Number 1,800,586 issued April 14, 1931, for a Natural gas conversion process; and my United States Letters Patent Number 2,027,460 issued January 14, 1936 for a Natural gas conversion process.

The advantages of my improvement are particularly applicable to the manufacture of gasoline from gases which are lighter than gasoline and hydrocarbon liquids which are heavier than gasoline. The process is carried out by mixing these materials and passing the mixture through a conversion tube in which such mixture is heated to high temperature under high pressure. The result of this treatment of these materials is to separate carbon from the liquid and combine such separated carbon with constituents of the gas, thus forming a part of the gas into gasoline.

An object of my present improvement is to avoid the deposition of carbon in an apparatus with which the process of chemically combining carbon with hydrocarbon gases is carried out. Other objects of my present improvement will be made apparent in this specification.

My new improvement will be understood from the following specification taken in connection with the drawing in which the apparatus used to carry out the improvement is illustrated in side elevation.

Referring to the drawing, a tube 1 leads from a pump 2 and is so disposed as to make several passages through a furnace 3 and exits therefrom, a valve 4 being mounted in the extension of tube 1 exiting from furnace 3. A pipe 5 leads from a supply of hydrocarbon gas to the pump 2 and a pipe 6 in which is mounted a pump 7 leads from a supply of hydrocarbon distillate into tube 1 at a point intermediate pump 2 and furnace 3. Gases delivered by pump 2 may be in either gaseous or liquid state.

As previously disclosed in my above referred to Patent Nos. 1,800,586 and 2,027,460, a part of the carbon content of hydrocarbon liquids is separated therefrom and chemically combined with hydrocarbon gases to form liquids by forcing such gases admixed with hydrocarbon liquids which are comparatively rich in carbon through a tube in which such mixture of gases and liquid is heated to elevated temperatures in the order of nine hundred (900° F.) degrees Fahrenheit to twelve hundred (1200° F.) degrees Fahrenheit, more or less, and subjected to heavy pressure while in such heated state.

I have discovered that in carrying out this process it is advantageous to admix with the gas a hydrocarbon liquid distillate, that is, a liquid which has previously been vaporized and condensed, in order that the same may be free from tars, resins, etc., and I have also discovered that it is desirable to limit the ratio of the weight of hydrocarbon liquid to the weight of hydrocarbon gases admixed. I have discovered that the ratio of the weight of hydrocarbon liquid to the weight of hydrocarbon gases which are mixed and so processed should preferably be less than one-tenth ($\frac{1}{10}$) and should in no case exceed one-fourth ($\frac{1}{4}$) and I have obtained excellent results by admixing hydrocarbon liquids and gases in the ratio of one part of liquid to twenty parts of gas measured by weight when treating butane gas admixed with kerosene distillate. When mixtures composed of one part of liquid with less than about four parts of gas measured by weight are processed deposits of carbon which are rapidly deposited in the conversion tube make it impossible to carry out the process. Preferably the liquid which is mixed with the gas should be of such character as to have a carbon residue (by Conradson test) of less than about one (1%) per cent in order to make it possible to carry out the process.

In carrying out this process with the above described apparatus, hydrocarbon liquid distillate is delivered by means of pump 7 through the pipe 6 and thence through the tube 1 while at the same time hydrocarbon gas is delivered by means of pump 2 through the tube 1. The capacity of pumps 2 and 7 being variable, any desired weight of distillate may be admixed with any desired weight of gas and the mixture delivered through the tube 1. The valve 4 is utilized to regulate the pressure maintained in the tube 1 and the temperature to which materials are raised in passage through the tube 1 is regulated through regulation of the quantity of fuel burned in the furnace.

The material produced as a result of the treatment of the gas and liquid and delivered through valve 4 consists of a mixture of synthetic crude oil and hydrocarbon gases and is delivered into any fractional distillation equipment and the desirable fractions of this material are recovered therein or this material may be cooled and otherwise collected. It is obvious that the distillate and gases may be premixed and the mixture delivered through the tube 1 by means of a single pump.

While I have set out in detail certain specific instructions regarding the manner of carrying out my new improvement, it should be understood that I do not propose to limit myself to these details but rather propose to claim broadly the advantage in my discovery that in combining carbon with hydrocarbon gases, as set out above, limiting the ratio of the weight of hydrocarbon liquid to the weight of hydrocarbon gases which are admixed makes it possible to carry out the process and also that utilizing hydrocarbon liquid which results from vaporization and condensation greatly facilitates the carrying out of the process.

I claim:

A process for treating hydrocarbon gases with hydrocarbon liquids to produce gasoline and a synthetic hydrocarbon crude oil, which comprises treating under elevated pressure and a temperature within the range of 900° F. and 1200° F. a mixture of substantially pure butane and a kerosene distillate having a carbon residue of less than 1% admixed in proportions by weight of twenty parts of butane with one part of kerosene distillate.

MALCOLM P. YOUKER.